(12) United States Patent
Kashiwagi et al.

(10) Patent No.: US 11,033,953 B2
(45) Date of Patent: Jun. 15, 2021

(54) METHOD FOR MANUFACTURING OUTER RING OF CONSTANT VELOCITY JOINT

(71) Applicant: JTEKT CORPORATION, Osaka (JP)

(72) Inventors: Isashi Kashiwagi, Kariya (JP); Takashi Okazaki, Anjo (JP)

(73) Assignee: JTEKT CORPORATION, Osaka (JP)

( * ) Notice: Subject to any disclaimer, the term of this patent is extended or adjusted under 35 U.S.C. 154(b) by 440 days.

(21) Appl. No.: 15/585,556

(22) Filed: May 3, 2017

(65) Prior Publication Data
US 2017/0326621 A1 Nov. 16, 2017

(30) Foreign Application Priority Data

May 11, 2016 (JP) .............................. JP2016-095069

(51) Int. Cl.
*B21K 1/76* (2006.01)
*B21J 5/02* (2006.01)
(Continued)

(52) U.S. Cl.
CPC ................. *B21K 1/761* (2013.01); *B21J 5/02* (2013.01); *B21K 1/765* (2013.01); *F16D 3/227* (2013.01);
(Continued)

(58) Field of Classification Search
CPC .. B21K 1/04; B21K 1/761–763; B21K 1/765; B21K 1/762; B21J 5/02;
(Continued)

(56) References Cited

U.S. PATENT DOCUMENTS

| 4,453,395 A | * | 6/1984 | Takeda ................... | B21D 53/84 |
| | | | | 72/348 |
| 5,184,494 A | * | 2/1993 | Krude ..................... | B21C 23/20 |
| | | | | 29/415 |

(Continued)

FOREIGN PATENT DOCUMENTS

| JP | 3-60838 A | 3/1991 |
| JP | 2007-513305 | 5/2007 |

(Continued)

OTHER PUBLICATIONS

Groover, Mikell P.,"Fundamentals of Modern Manufacturing: Materials, Processes, and Systems", 2010, John Wiley & Sons, 4th Edition, p. 483-488 and 520 (Year: 2010).*

(Continued)

*Primary Examiner* — Debra M Sullivan
(74) *Attorney, Agent, or Firm* — Oblon, McClelland, Maier & Neustadt, L.L.P.

(57) ABSTRACT

A method is provided for manufacturing an outer ring of a constant velocity joint including an outer ring, an inner rotational member, a torque-transmitting rolling element, and a defining member. The outer ring includes: a first inner peripheral surface to which the defining member is attached; a second inner peripheral surface; and protrusions protruding radially inward of the first inner surface and the second inner peripheral surface so as to restrict axial movement of the inner rotational member and the rolling element. The manufacturing method includes: a plastic working step involving providing a base member; and a bottom removing step involving partially removing a bottom of the base member so as to form a through hole. The plastic working step further involves providing the second inner peripheral surface. The bottom removing step further involves providing the protrusions.

10 Claims, 10 Drawing Sheets

(51) Int. Cl.
  *F16D 3/227* (2006.01)
  *F16D 3/224* (2011.01)
(52) U.S. Cl.
  CPC .......... *F16D 3/224* (2013.01); *F16D 2250/00* (2013.01); *F16D 2300/12* (2013.01)
(58) Field of Classification Search
  CPC . B21J 5/025; B21J 5/027; F16D 3/226; F16D 3/224; F16D 3/227; F16D 2250/00; F16D 2250/0023; F16D 2300/12; Y10S 464/906; B21D 53/84; B21D 28/243
  USPC .................................... 72/333; 464/146, 906
  See application file for complete search history.

(56) References Cited

U.S. PATENT DOCUMENTS

| | | | | |
|---|---|---|---|---|
| 5,894,752 | A * | 4/1999 | Yano ....................... | B21C 23/18 72/355.2 |
| 8,197,349 | B2 * | 6/2012 | Terada ................... | F16D 3/227 403/359.5 |
| 8,641,538 | B2 * | 2/2014 | Oh .......................... | F16D 3/223 464/146 |
| 10,086,423 | B2 * | 10/2018 | Shimizu ................. | B21D 53/34 |
| 2005/0124423 | A1 | 6/2005 | Kuczera et al. | |
| 2008/0120846 | A1 * | 5/2008 | Doi .......................... | B21J 3/00 29/898.066 |

FOREIGN PATENT DOCUMENTS

| | | |
|---|---|---|
| JP | 2008-213650 | 9/2008 |
| JP | 2011-252547 A | 12/2011 |

OTHER PUBLICATIONS

Office Action dated Mar. 3, 2020 in corresponding Japanese Patent Application No. 2016-095069, 6 pages.

* cited by examiner

METHOD FOR MANUFACTURING OUTER RING OF CONSTANT VELOCITY JOINT

INCORPORATION BY REFERENCE

The disclosure of Japanese Patent Application No. 2016-095069 filed on May 11, 2016, including the specification, drawings and abstract, is incorporated herein by reference in its entirety.

BACKGROUND OF THE INVENTION

1. Field of the Invention

The invention relates to methods for manufacturing outer rings of constant velocity joints.

2. Description of Related Art

Japanese Patent Application Publication No. 2008-213650 (JP 2008-213650 A) and Japanese Unexamined Patent Application Publication (Translation of PCT Application) No. 2007-513305 (JP-T-2007-513305) each disclose a sliding constant velocity joint including internal components (such as an inner ring) and an outer ring connected to a tube of a propeller shaft. The internal components of the constant velocity joint are configured to slide into the tube of the propeller shaft so as to absorb energy produced by a vehicle collision. Such a sliding constant velocity joint requires a defining member that defines a grease region. This makes it necessary to prevent disengagement of the defining member when the propeller shaft is conveyed before the propeller shaft is assembled to a vehicle and when the propeller shaft is assembled to the vehicle. Specifically, the range of movement of the internal components of the constant velocity joint needs to be restricted so that the internal components (such as the inner ring) will not come into contact with the defining member in such situations.

The constant velocity joint disclosed in JP 2008-213650 A includes a restricting member (or more specifically, a second restricting member), such as a deformable circlip, so as to restrict the range of movement of the internal components. When an impact resulting from a vehicle collision is applied to the internal components, the internal components deform the second restricting member and move into contact with the defining member. Thus, the internal components cause disengagement of the defining member and slide into the tube so as to absorb the impact. The constant velocity joint disclosed in JP-T-2007-513305 includes a restricting member, such as a circlip or a thickened portion or element, so as to achieve effects similar to those achieved by the constant velocity joint disclosed in JP 2008A.

The constant velocity joints disclosed in the above patent documents each include a restricting member, such as a circlip or a thickened portion or element, and are thus unfortunately expensive.

SUMMARY OF THE INVENTION

An object of the invention is to provide a method for inexpensively manufacturing an outer ring of a constant velocity joint to be assembled to a propeller shaft, in a manner that eliminates the need for a circlip.

A manufacturing method according to an embodiment of the invention is a method for manufacturing an outer ring of a constant velocity joint. The outer ring includes a first opening at a first end of the outer ring and a second opening at a second end of the outer ring such that the outer ring has a tubular shape. The constant velocity joint further includes an inner rotational member, a rolling element, and a defining member. The inner rotational member is disposed radially inward of the outer ring. The rolling element is configured to transmit torque between the outer ring and the inner rotational member. The defining member is disposed adjacent to the first opening of the outer ring and defines a grease-filled region.

The outer ring further includes a first inner peripheral surface, a second inner peripheral surface, and a protrusion. The first inner peripheral surface extends from the first opening toward the second opening. The first inner peripheral surface is configured such that the defining member is attached to the first inner peripheral surface. The second inner peripheral surface extends from the second opening toward the first opening. The second inner peripheral surface is configured such that the inner rotational member and the rolling element are movable along the second inner peripheral surface. The protrusion protrudes radially inward of the first inner peripheral surface and the second inner peripheral surface. The protrusion is configured to restrict axial movement of the inner rotational member and the rolling element.

The outer ring manufacturing method includes: a plastic working step involving providing a bottomed tubular base member including the second opening and a bottom adjacent to a portion of the base member where the first opening is to be provided; and a bottom removing step involving partially removing the bottom of the base member so as to form a through hole passing through the bottom along an axis of the base member. The plastic working step further involves providing the second inner peripheral surface. The bottom removing step further involves providing the protrusion such that a surface of a remainder of the bottom resulting from the formation of the through hole and facing toward the second opening serves as a surface of the protrusion.

Thus, manufacture of the constant velocity joint involves providing the base member including the bottom by plastic working (or forging) in the plastic working step. The manufacture of the constant velocity joint further involves partially removing the bottom so as to form the through hole in the bottom removing step. Providing the through hole involves providing the protrusion such that a surface of the remainder of the bottom facing toward the second opening serves as a surface of the protrusion. The protrusion functions as a restrictor to restrict movement of the inner ring when a propeller shaft including the constant velocity joint is assembled to a vehicle. The manufacturing method described above easily provides the protrusion only by plastic working (or forging) in the plastic working step and the removing process in the bottom removing step. This means that unlike conventional manufacturing methods, the above-described manufacturing method does not require addition of a circlip, formation of a thickened portion or element by welding, or formation of the protrusion by cutting throughout its entirety. Consequently, the manufacturing cost of the above-described constant velocity joint is lower than the manufacturing cost of a conventional constant velocity joint.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
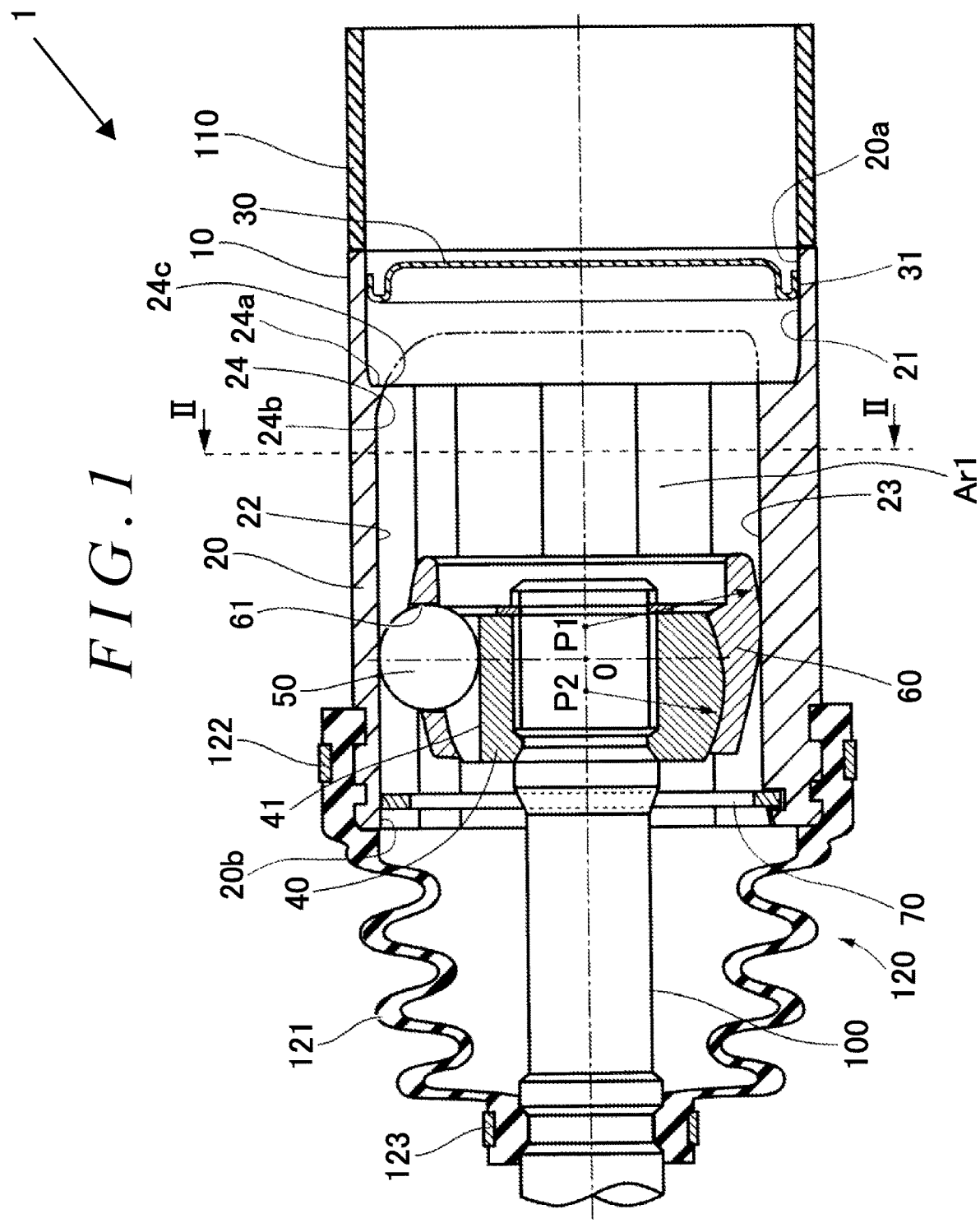
FIG. 1 is an axial cross-sectional view of a propeller shaft according to a first embodiment of the invention taken along the line I-I indicated by the arrows in FIG. 2, as viewed in the direction of the arrows.

First, a propeller shaft 1 according to a first embodiment of the invention will be described. Manufacture of the propeller shaft 1 involves assembling a constant velocity joint 10 to the propeller shaft 1. Specifically, manufacture of the propeller shaft 1 involves coupling a stub shaft 100 to an inner ring 40 of the constant velocity joint 10 and securing a tube 110 to an outer ring 20 of the constant velocity joint 10.

As illustrated in FIG. 1, the propeller shaft 1 includes the constant velocity joint 10, the stub shaft 100, the tube 110, and a boot unit 120. Examples of the constant velocity joint 10 include a ball constant velocity joint, such as a double offset constant velocity joint (DOJ). The first embodiment will be described on the assumption that the constant velocity joint 10 is a double offset constant velocity joint. The constant velocity joint 10 includes the outer ring 20, a defining member 30, the inner ring 40 (equivalent to an "inner rotational member"), a plurality of balls 50 (equivalent to a "rolling element"), a retainer 60, and a snap ring 70.

The outer ring 20 includes: a first opening 20a at a first end of the outer ring 20 (i.e., at the right end of the outer ring 20 in FIG. 1); and a second opening 20b at a second end of the outer ring 20 (i.e., at the left end of the outer ring 20 in FIG. 1). Thus, the outer ring 20 has a tubular shape. The outer ring 20 further includes a first inner peripheral surface 21, a plurality of outer ring ball groves 22, a plurality of cylindrical surfaces 23, and protrusions 24. The first inner peripheral surface 21, the outer ring ball groves 22, the cylindrical surfaces 23, and the protrusions 24 are located on the inner side of the outer ring 20. The first inner peripheral surface 21 is disposed adjacent to the first opening 20a. The outer ring ball grooves 22 and the cylindrical surfaces 23 are disposed adjacent to the second opening 20b. The protrusions 24 are provided between the first inner peripheral surface 21 and outer ring ball groves 22 along the axis of the outer ring 20.

The first inner peripheral surface 21 extends from the first opening 20a toward the second opening 20b. The first inner peripheral surface 21 is configured such that the defining member 30 is attached to the first inner peripheral surface 21. Specifically, the first inner peripheral surface 21 is configured such that an outer peripheral surface 32 of the defining member 30 is attached to the first inner peripheral surface 21 by press fitting.

The outer ring ball grooves 22 and the cylindrical surfaces 23 serve as a second inner peripheral surface of the outer ring 20 according to the invention. The outer ring ball grooves 22 and the cylindrical surfaces 23 each extend from the second opening 20b toward the first opening 20a. The inner ring 40 (i.e., the inner rotational member) and the balls 50 (i.e., the rolling element) are movable along the axis of the outer ring 20.

Figure 2:
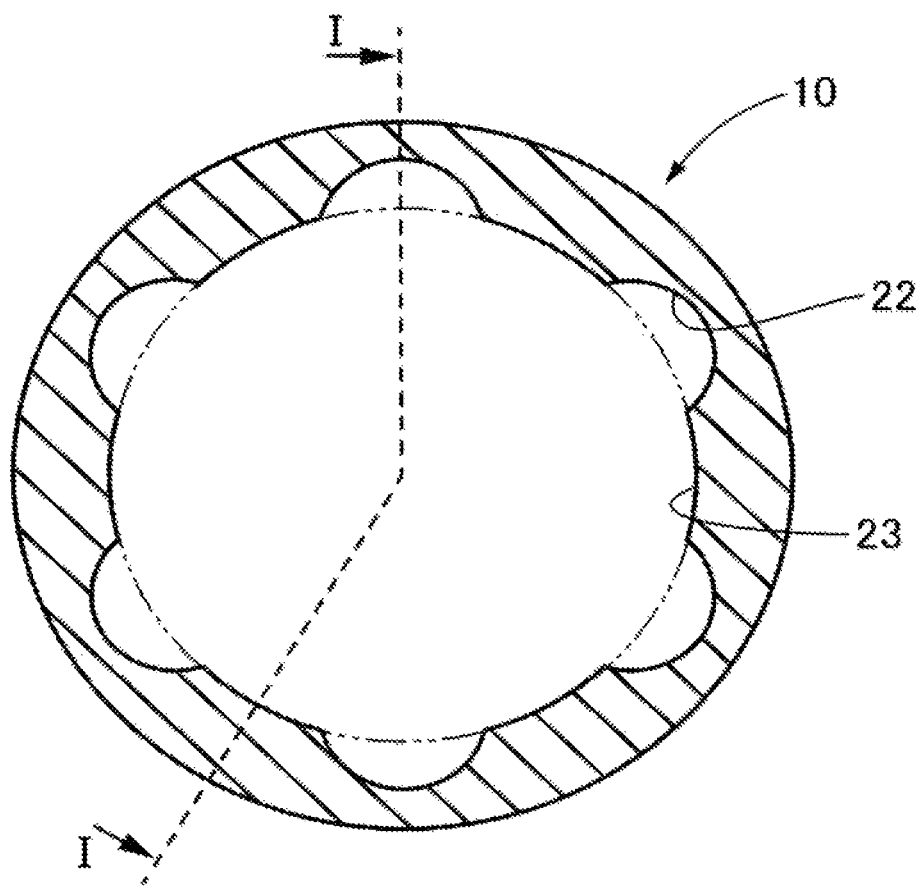
FIG. 2 is a cross-sectional view of an outer ring taken along the line II-II indicated by the arrows in FIG. 1, as viewed in the direction of the arrows.

The outer ring ball groves 22 extend in parallel with the axis of the outer ring 20. As illustrated in FIG. 2, the outer ring ball grooves 22 are equiangularly and equidistantly spaced around the axis of the outer ring 20. As illustrated in FIGS. 1 and 2, the cylindrical surfaces 23 are each in the form of a segment of circle whose center is the axis of the outer ring 20 and have the same distance from the axis of the outer ring 20. The cylindrical surfaces 23 are each located between the adjacent outer ring ball grooves 22 around the axis of the outer ring 20 and extend in parallel with the axis of the outer ring 20.

Each protrusion 24 protrudes radially inward of the first inner peripheral surface 21 and the associated outer ring ball groove 22 (defining a portion of the second inner peripheral surface) and toward the axis of the outer ring 20. Thus, each protrusion 24 is configured to abut against the associated ball 50 (i.e., the rolling element) so as to restrict movement of the ball 50 and the inner ring 40 (that axially moves together with the ball 50) toward the first opening 20a. Each protrusion 24 includes: a surface 24a facing toward the first opening 20a; a surface 24b facing toward the second opening 20b; and an acute angle vertex 24c. This embodiment will be described on the assumption that the outer ring ball grooves 22 are six in number and the six outer ring ball grooves 22 are each provided with the associated protrusion 24. The invention, however, is not limited to this arrangement. Alternatively, at least one of the outer ring ball grooves 22 may be provided with the protrusion 24. The tube 220 has a hollow cylindrical shape. The tube 110 is secured to an end face of the outer ring 20 adjacent to the first opening 20a by welding or crimping, for example. The boot unit 120 is attached to a portion of the outer ring 20 adjacent to the second opening 20b.

As illustrated in FIG. 1, the defining member 30 is disposed adjacent to the first opening 20a, of the outer ring 20 so as to define a grease-filled region Ar1 located radially inward of the outer ring 20. The grease-filled region Ar1 is filled with grease (not illustrated) serving as a lubricant. Specifically, the defining member 30 has a disk shape and includes a curved outer edge provided with an outer peripheral surface 31 that is press-fitted to the first inner peripheral surface 21. This allows the defining member 30 to define: the grease-filler region Ar1 located inside the outer ring 20 (i.e., radially inward of the outer ring 20); and an inner space of the tube 110. Thus, the defining member 30 functions as a seal to prevent leakage of grease from the grease-filler region A1 to the inner space of the tube 110.

The defining member 30 is press-fitted to the first inner peripheral surface 21 with a press-fitting load p1. Suppose that a load exceeding the press-fitting load p1 and a load F1 is applied to the defining member 30 from the second opening 20b toward the first opening 20a. In this case, the load exceeding the load F1 causes the defining member 30 to move further toward the first opening 20a.

The inner ring 40 is disposed in a radially-inner space of the outer ring 20. The radially-inner space of the outer ring 20 also partially serves as the grease-filled region Ar1. The inner ring 40 has a cylindrical shape. The inner periphery of the inner ring 40 is connected with an end of the stub shaft 100, so that the inner ring 40 and the stub shaft 100 are coupled to each other. The inner ring 40 includes an outer peripheral surface having a convex spherical shape. The convex spherical outer peripheral surface of the inner ring 40 is provided with a plurality of inner ring ball grooves 41 (equivalent to "inner rotational member ball grooves"). The inner ring ball grooves 41 extend in parallel with the axis of the inner ring 40 (equivalent to an "axis of the inner rotational member"). The inner ring ball grooves 41 are equiangularly and equidistantly spaced around the axis of the inner ring 40.

The balls 50 are each in engagement with the associated outer ring ball groove 22 and the associated inner ring ball groove 41, with each of the outer ring ball grooves 22 facing an associated one of the inner ring ball grooves 41 in a direction perpendicular to the axis of the outer ring 20 and the axis of the inner ring 40. The balls 50 are disposed such that each ball 50 is allowed to roll along the associated outer ring ball groove 22 and the associated inner ring ball groove 41. Thus, each ball 50 is movable along the axis of the outer ring 20 and the axis of the inner ring 40. Each ball 50 is configured to transmit torque (or rotational driving force) between the outer ring 20 and the inner ring 40.

The retainer 60 is disposed between the outer ring 20 and the inner ring 40. The retainer 60 has a substantially cylindrical shape. The retainer 60 includes an inner peripheral surface having a concave spherical shape conforming to the convex spherical shape of the outer peripheral surface of the inner ring 40 such that the inner peripheral surface of the retainer 60 is in contact with the outer peripheral surface of the inner ring 40. The retainer 60 includes an outer peripheral surface having a convex spherical shape such that the outer peripheral surface of the retainer 60 is in contact with the inner peripheral surface of the outer ring 20.

The center of a sphere defined by the convex spherical outer peripheral surface of the retainer 60 will be referred to as a "spherical center P1". As illustrated in FIG. 1, the spherical center P1 is offset toward the first opening 20a of the outer ring 20 with respect to a joint center O. The center of a sphere defined by the concave spherical inner peripheral surface of the retainer 60 will be referred to as a "spherical center P2". The spherical center P2 is offset toward the second opening 20b with respect to the joint center O. This means that the direction of offset of the spherical center P2 is opposite to the direction of offset of the spherical center P1. The amount of offset of the spherical center P1 is equal to the distance between the spherical center P1 and the joint center O. The retainer 60 is provided with a plurality of circumferentially equidistantly spaced windows 61. Each ball 50 is fitter into and held by an associated one of the windows 61. Thus, the retainer 60 retains the balls 50 with the inner ring 40.

The boot unit 120 includes a boot 121, a large diameter clamping member 122, and a small diameter clamping member 123. The boot 121 has a bellows-like tubular shape such that the boot 121 is extendable and contractible along the central axis of the boot 121 and the central axis of the boot 121 is bendable. The boot 121 includes a first end attached to a portion of the outer peripheral surface of the outer ring 20 adjacent to the second opening 20b. The first end of the boot 121 is the right end of the boot 121 in FIG. 1. The outer periphery of the first end of the boot 121 is clamped by the large diameter clamping member 122.

The boot 121 includes a second end attached to a portion of the outer peripheral surface of the stub 100 away from the inner ring 40. The second end of the boot 121 is the left end of the boot 121 in FIG. 1. The outer peripheral surface of the second end of the boot 121 is clamped by the small diameter clamping member 123. Thus, the boot 121 closes the second opening 20b of the outer ring 20. The grease-filled region Ar1 defined by the defining member 30 and the boot 121 and located inside the outer ring 20 is filled with grease. The defining member 30 and the boot 121 function as a seal to prevent leakage of grease from the outer ring 20.

The snap ring 70 has an annular shape. The snap ring 70 is disposed on a portion of the inner periphery of the outer ring 20 adjacent to the second opening 20b. The snap ring 70 functions to prevent disconnection of the inner ring 40 and other components contained in the space radially inward of the outer ring 20. The snap ring 70 includes an outer edge in engagement with an inner peripheral groove provided in the inner peripheral surface of the end of the outer ring 20 adjacent to the second opening 20b. This allows the snap ring 70 to abut against portion(s) of the balls 50 or the retainer 60. Consequently, the snap ring 70 prevents disengagement of the inner ring 40 (that axially moves together with the balls 50 and the retainer 60) from the outer ring 20.

Before the propeller shaft 1 is assembled to a vehicle, the inner ring 40 is axially movable relative to the outer ring 20. The range of movement of the inner ring 40, however, is restricted by the protrusion 24 and the snap ring 70. This prevents the inner ring 40 and adjacent components from coming into contact with the defining member 30. Thus, the defining member 30 will not be disengaged from the outer ring 20.

During normal running of the vehicle after the propeller shaft 1 is assembled to the vehicle, the range of movement of the inner ring 40 and the stub shaft 100 relative to the outer ring 20 is restricted. Thus, the balls 50 will not come into contact with the protrusions 24 or the snap ring 70 during normal running of the vehicle.

Collision of the vehicle with an obstacle causes the inner ring 40 to move, together with the stub shaft 100, toward the first opening 20a relative to the outer ring 20. The movement of the inner ring 40 causes each ball 50 to collide against and go over the associated protrusion 24 with a load exceeding the load F1. This results in collision of the inner ring 40 and adjacent components with the defining member 30, causing the defining member 30 to be disengaged from the outer ring 20. The inner ring 40 and adjacent components then move further along the space inside the tube 110 so as to favorably absorb energy produced by the collision of the vehicle with the obstacle. The obsorption of the collision energy protects occupant(s) of the vehicle.

A method for manufacturing the outer ring 20 of the constant velocity joint 10 will be described below with reference to FIGS. 3, 4A, 4B, 4C, and 5. As illustrated in the flow chart of FIG. 3, the method for manufacturing the outer ring 20 (i.e., a first manufacturing method) includes a plastic working step S10 and a bottom removing step S20. The bottom removing step S20 includes a punching step S20A and a cutting step S20B. A material to be supplied in the plastic working step S10 has a columnar shape.

Figure 4A:
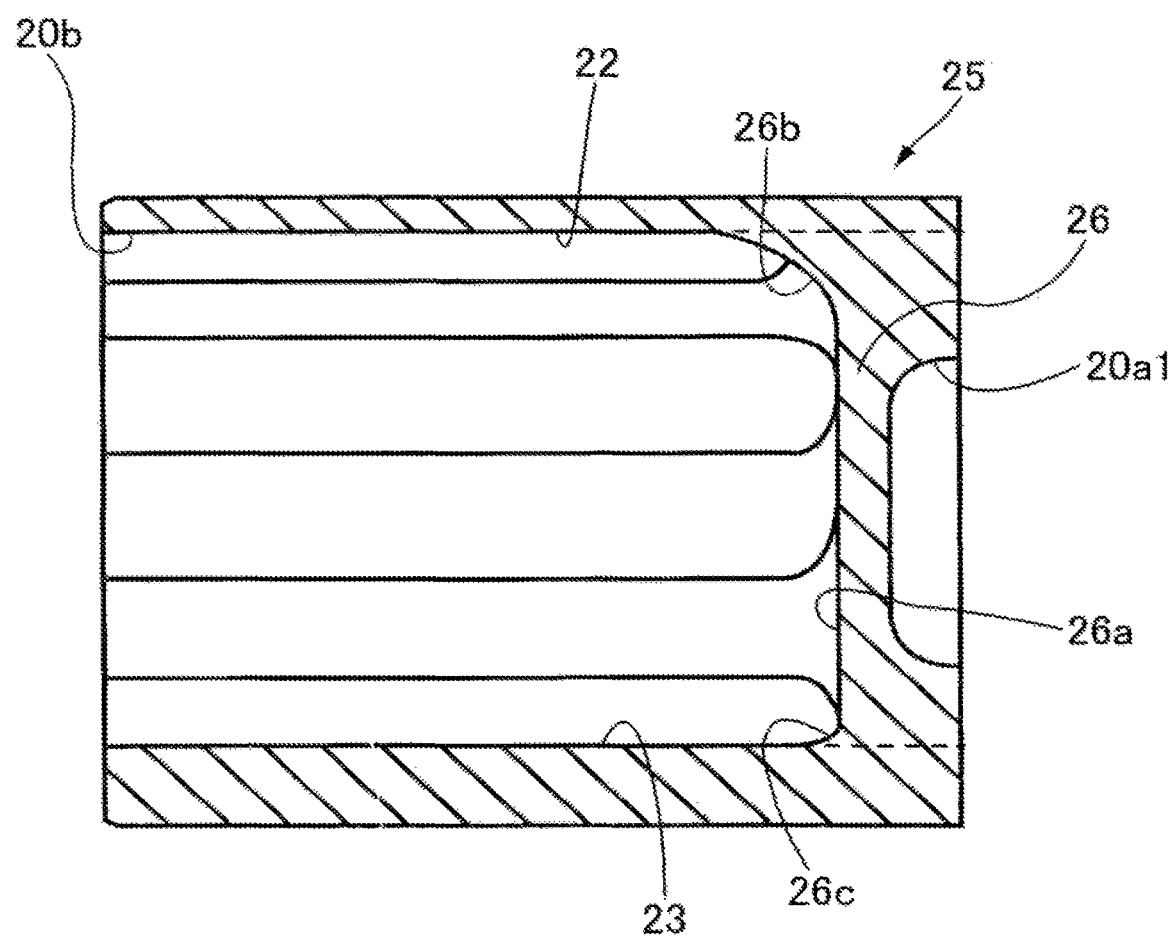
FIG. 4A is a diagram illustrating the cross-sectional shape of a base member for the outer ring after plastic working in a plastic working step S10, as viewed in the same direction as FIG. 1.

In the plastic working step S10, the material supplied is subjected to cold forging and cold ironing so as to provide a bottomed tubular base member 25 illustrated in FIG. 4A. The base member 26 includes the second opening 20b, the outer ring ball grooves 22, the cylindrical surfaces 23, and a bottom 26. The outer ring ball grooves 22 and the cylindrical surfaces 23 define the second inner peripheral surface. At this point, the base member 25 is yet to be provided with the first opening 20a described above, but a portion of the base member 25 to be provided with the first opening 20a includes a recess 20a1 that serves as a basis for the first opening 20a.

The outer ring ball grooves 22 (each defining a portion of the second inner peripheral surface) and the cylindrical surfaces 23 (each defining a portion of the second inner peripheral surface) of the base member 25 are provided by cold forging and cold ironing. The bottom 26 is provided by cold forging. Suppose that the outer ring ball grooves 22 and the cylindrical surfaces 23 each extend along the entire axial length of the base member 25 in this embodiment. In this case, the bottom 26 is a portion of the base member 25 radially inward of the outer ring ball grooves 22 and the cylindrical surface 23. This means that the bottom 26 is a portion of the base member 25 radially inward of the dashed lines in FIG. 4A.

The bottom 26 includes a bottom surface 26a, inclined surfaces 26b, and inclined surfaces 26c. The bottom surface 26a, the inclined surfaces 26b, and the inclined surfaces 26c face toward the second opening 20b. The bottom surface 26a perpendicularly intersects the axis of the outer ring 20. Each inclined surface 26b connects the bottom surface 26a with an associated one of the outer ring ball grooves 22 (defining a portion of the second inner peripheral surface). Each inclined surface 26c connects the bottom surface 26a with an associated one of the cylindrical surfaces 23 (defining a portion of the second inner peripheral surface). The inclined surfaces 26b and 26c are provided not by cutting but by forging. As illustrated in FIG. 4A, the inclined surfaces 26b and 26c may be curved. Alternatively, the inclined surfaces 26b and 26c may be linearly tapered. The inclined surfaces 26b and 26c may each be curved with a constant radius of curvature or a gradually changing radius of curvature.

The bottom removing step S20 involves: partially removing the bottom 26 of the base member 25 so as to form a through hole 26d passing through the bottom 26 along the axis of the outer ring 20; and providing the first inner peripheral surface 21. The bottom removing step S20 includes the punching step S20A and the cutting step S20B.

Figure 4B:
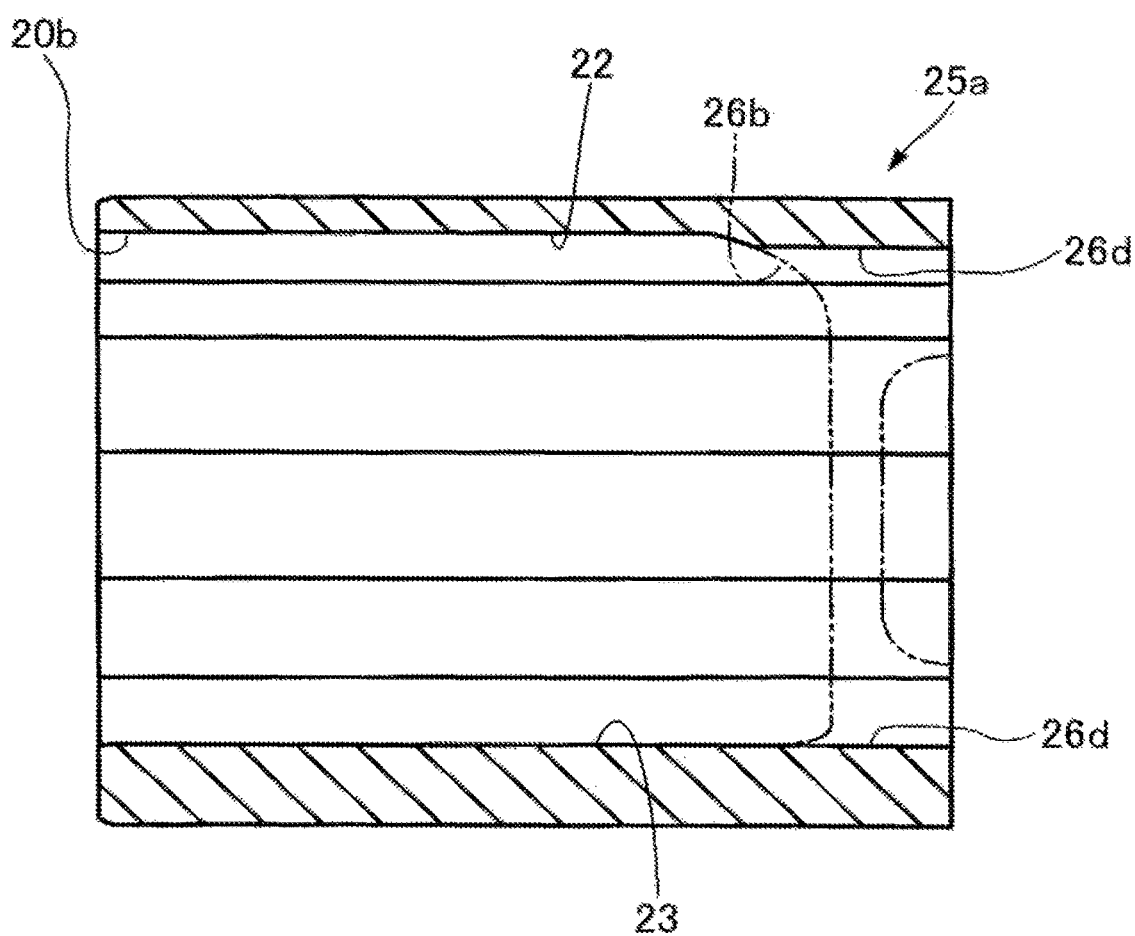
FIG. 4B is a diagram illustrating the cross-sectional shape of an intermediate member for the outer ring after punching in a punching step S20A included in a bottom removing step S20, as viewed in the same direction as FIG. 1.

As illustrated in FIG. 4B, the punching step S20A, included in the bottom removing step S20, involves partially removing the bottom 26 of the base member 25 so as to form the through hole 26d passing through the bottom 26 along the axis of the outer ring 20. This provides an intermediate member 25a for the outer ring 20. The through hole 26d of the intermediate member 25a is provided by punching using a forging die. The through hole 26d may pass only through the bottom surface 26a of the bottom 26. The through hole 26d preferably passes through the bottom surface 26a and a portion of the inclined surfaces 26b of the bottom 26 such that the inner peripheral surface of the through hole 26d is continuous with the inclined surfaces 26b of the bottom 26. Such an arrangement enables the remainder of each inclined surface 26b of the bottom 26 in its as-is state to serve as the surface 24b of the associated protrusion 24 facing toward the second opening 20b.

Figure 4C:
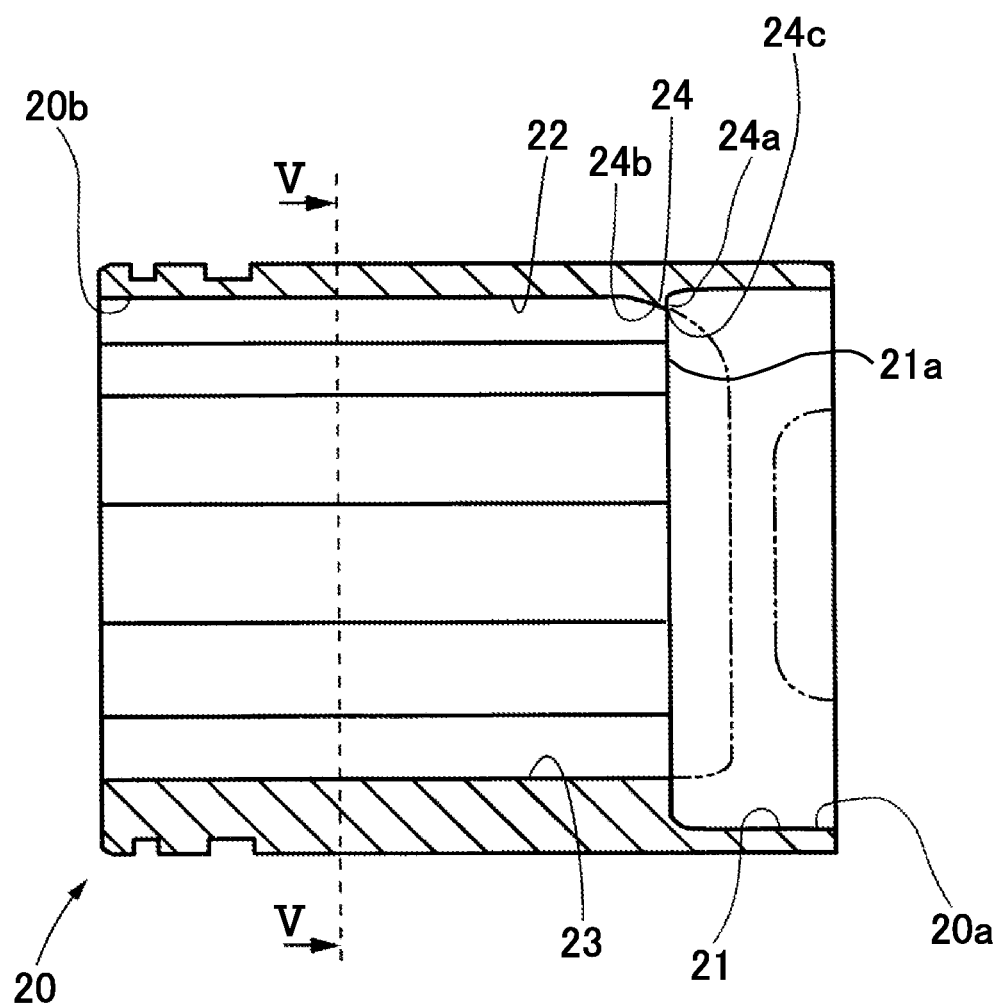
FIG. 4C is a diagram illustrating the cross-sectional shape of the outer ring after a cutting process in a cutting step S20B included in the bottom removing step S20, as viewed in the same direction as FIG. 1.
Figure 5:
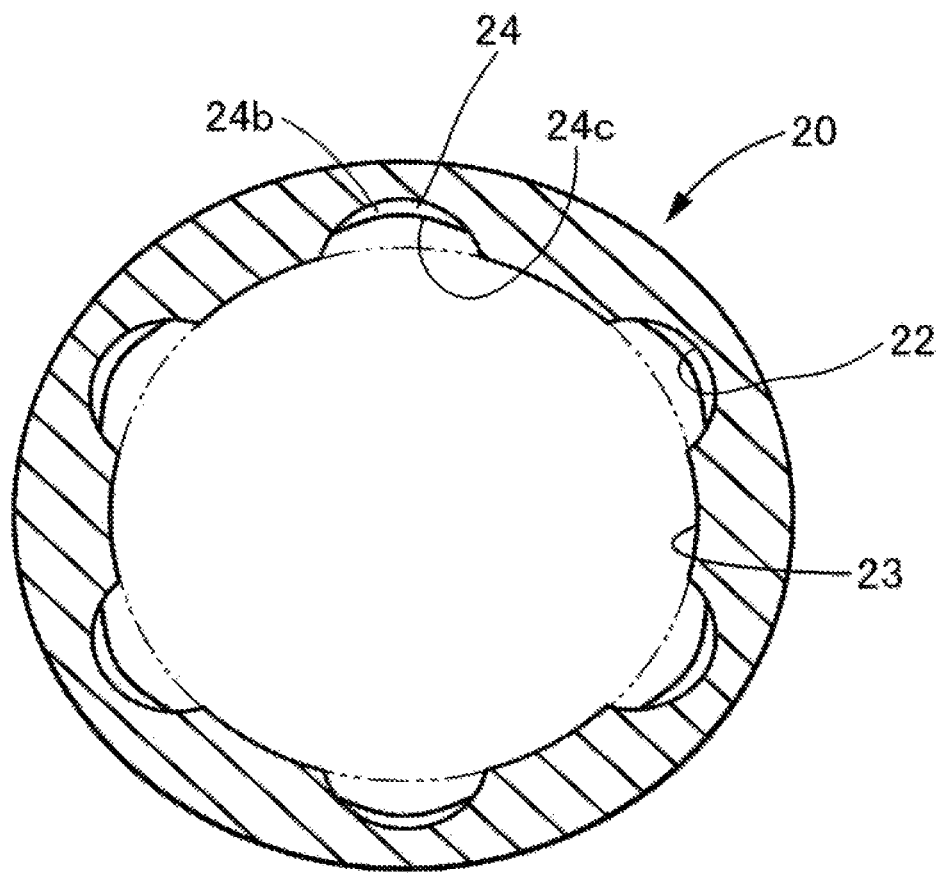
FIG. 5 is a cross-sectional view taken along the line V-V indicated by the arrows in FIG. 4C, as viewed in the direction of the arrows.

The cutting step S20B, included in the bottom removing step S20, involves cutting the intermediate member 25a so as to provide the outer ring 20. Specifically, as illustrated in FIG. 4C, the cutting step S20B involves cutting the intermediate member 25a so as to provide the first inner peripheral surface 21 on a portion of the intermediate member 25a adjacent to the first opening 20a. The outer peripheral surface 31 of the defining member 30 is to be press-fitted to the first inner peripheral surface 21. In the cutting step S20B, the first opening 20a and the first inner peripheral surface 21 are provided simultaneously. Providing the first inner peripheral surface 21 involves forming, at the same time, a cylindrical hole radially inward (or radially inside) of the first inner peripheral surface 21 such that a cylindrical bottom surface 21a of the cylindrical hole intersects the remainder of each inclined surface 26b. Thus, as illustrated in FIGS. 4C and 5, each resulting protrusion 24 includes the acute angle vertex (or intersection) 24c. Although not described in detail, the cutting step S20B involves providing groove(s) on a portion of the outer peripheral surface of the outer ring 20 adjacent to the second opening 20b. The groove(s) is/are to be used for attachment of the first end of the boot 121 to the outer ring 20. The invention, however, is not limited to this arrangement. Alternatively, the groove(s) to be used for attachment of the first end of the boot 121 to the outer ring 20 may be provided by forging in a different step.

As a result of performing the cutting step S20B, each resulting protrusion 24 includes the surface 24b facing toward the second opening 20b, the surface 24a facing toward the first opening 20a, and the acute angle vertex 24c as previously described. The surface 24b of each protrusion 24 facing toward the second opening 20b is a portion of the remainder of the associated inclined surface 26b provided not by cutting but only by forging. This means that a portion of each inclined surface 26b provided only by forging will serve as a surface of the associated protrusion 24. Performing forging and cutting in combination provides the protrusions 24 easily in a short time, enabling low-cost manufacture of the outer ring 20. Providing the first inner peripheral surface 21 by cutting involves forming, at the same time, the cylindrical hole having the cylindrical bottom surface 21a that provides the acute angle vertex 24c and the surface 24a (facing toward the first opening 20a) of each protrusion 24. This results in an increase in efficiency.

A second embodiment of the invention will be described below. In the first embodiment, the cutting step S20B, included in the bottom removing step S20 in the flow chart of the first manufacturing method illustrated in FIG. 3, involves providing the first inner peripheral surface 21. Providing the first inner peripheral surface 21 in the cutting step S20B in the first embodiment involves forming, at the same time, the cylindrical hole radially inward (or radially inside) of the first inner peripheral surface 21 such that the cylindrical bottom surface 21a of the cylindrical hole intersects the remainder of each inclined surface 26b and thus each resulting protrusion 24 includes the acute angle vertex 24c. The invention, however, is not limited to this embodiment.

Figure 3:
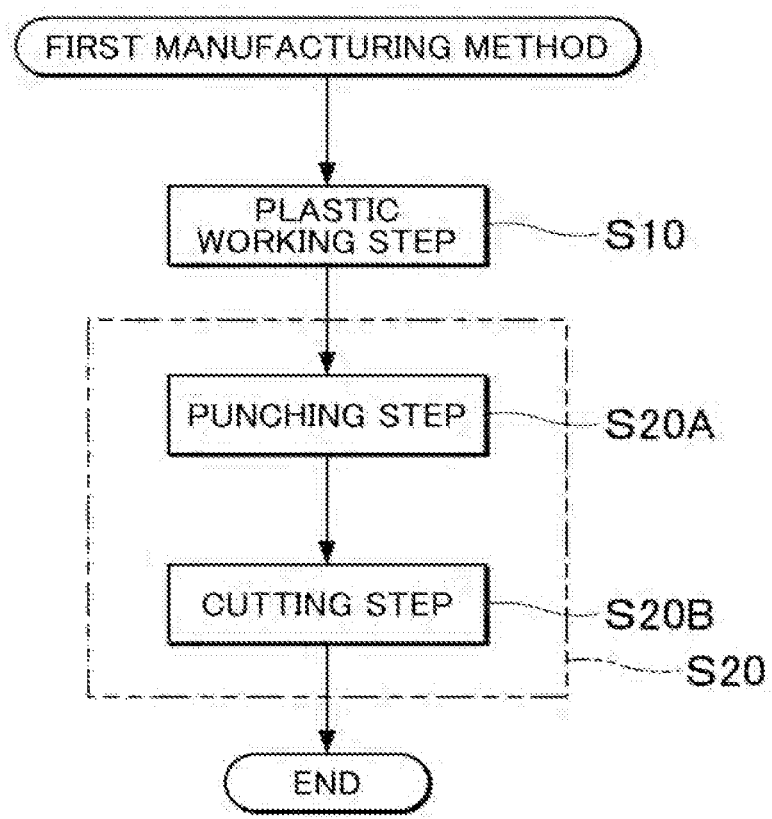
FIG. 3 is a flow chart illustrating a first outer ring manufacturing method according to the first embodiment.
Figure 6:
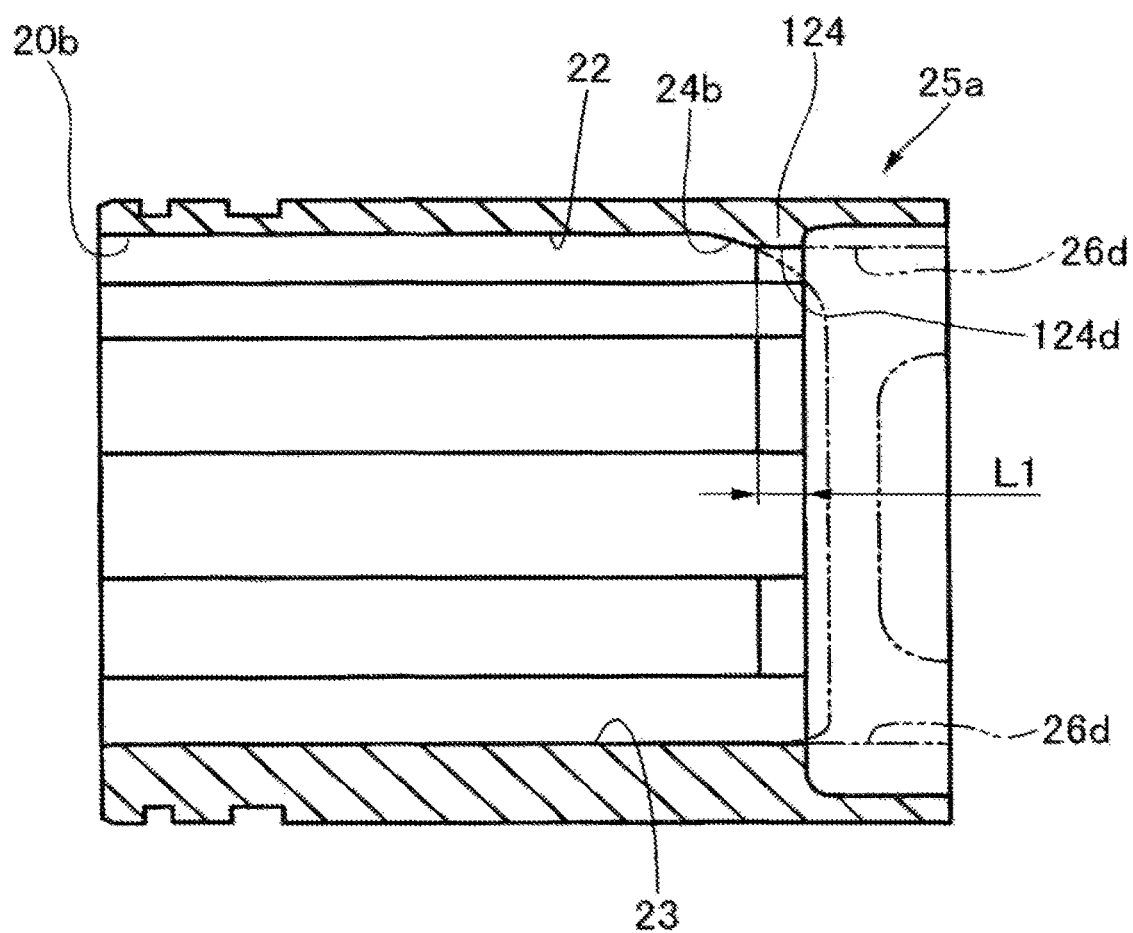
FIG. 6 is a diagram illustrating the shape of a protrusion 124 according to a second embodiment of the invention.

In the second embodiment, providing the first inner peripheral surface 21 in the cutting step S20B, included in the bottom removing step S20 in the flow chart illustrated in FIG. 3, may involve forming, at the same time, a cylindrical hole radially inward (or radially inside) of the first inner peripheral surface 21 such that the cylindrical bottom surface 21a of the cylindrical hole does not intersect each inclined surface 26b but intersects the inner peripheral surface of the through hole 26d as illustrated in FIG. 6. Each resulting protrusion 124 in this case may include a top face 124d having a length L1 defined by a portion of the inner peripheral surface of the through hole 26d formed by punching in the punching step S20A.

Figure 7:
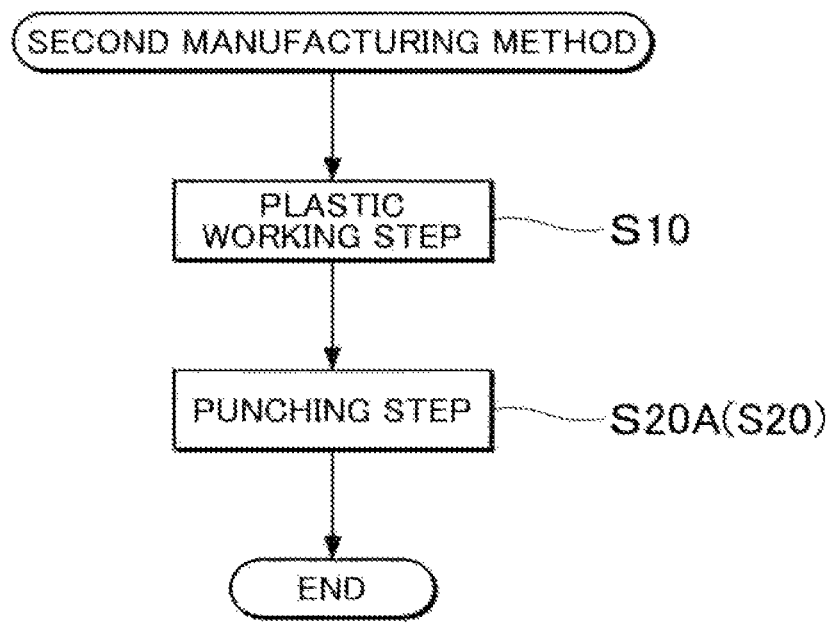
FIG. 7 is a flow chart illustrating a second outer ring manufacturing method according to a third embodiment of the invention.

A third embodiment of the invention will be described below. In each of the first and second embodiments, the cutting step S20B, included in the bottom removing step S20, involves providing the first inner peripheral surface 21 by cutting. The invention, however, is not limited to these embodiments. The third embodiment may involve providing the first inner peripheral surface simultaneously with other element(s) or component(s) in either one of the plastic working step S10 and the punching step S20A (i.e., the bottom removing step S20), in the flow chart of a second manufacturing method illustrated in FIG. 7.

Suppose that the first inner peripheral surface is provided in the plastic working step S10. In this case, plastic working may be performed such that the diameter of opening of the recess 20a1 illustrated in FIG. 4A is further increased, and thus the inner peripheral surface of the recess 20a1 serves as the first inner peripheral surface. Similarly to the second embodiment, each resulting protrusion in this case is provided with a top face after the punching step S20A is carried out.

Suppose that the first inner peripheral surface is provided in the punching step S20A (i.e., the bottom removing step S20). In this case, a portion of the through hole 26d illustrated in FIG. 4B may serve as the first inner peripheral surface. A portion of the through hole 26d located closer to the second opening 20b than a portion of the through hole 26d where the first inner peripheral surface is formed is provided with the top face of each protrusion. This means that the top face of each protrusion is continuous with the first inner peripheral surface on the same plane. Thus the third embodiment eliminates the cutting step S20B, resulting in a further reduction in cost.

Figure 8:
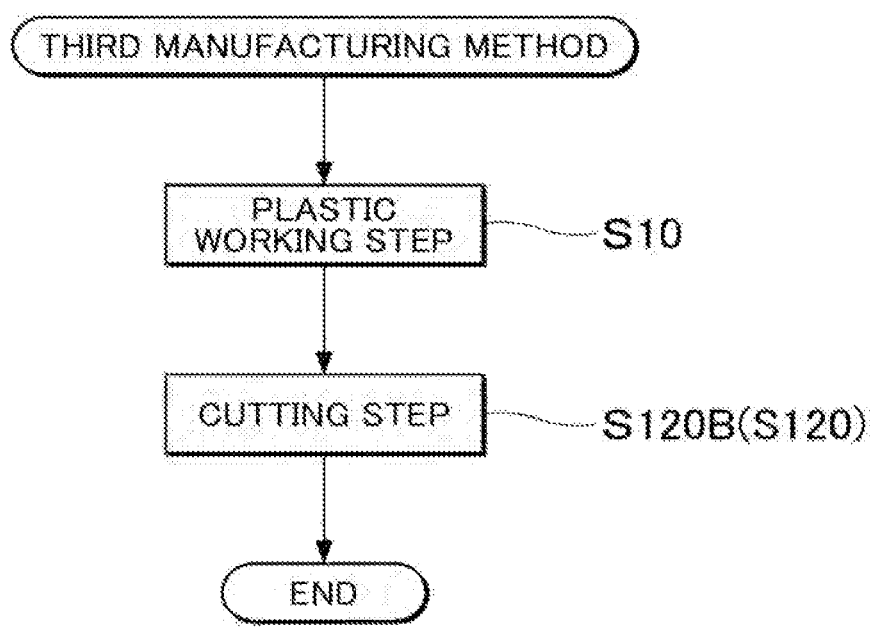
FIG. 8 is a flow chart illustrating a third outer ring manufacturing method according to a fourth embodiment of the invention.

A fourth embodiment of the invention will be described below with reference to the flow chart of a third manufacturing method illustrated in FIG. 8. In each of the first to third embodiments, the through hole 26d is provided by punching using a forging die in the punching step S20A included in the bottom removing step S20. The invention, however, is not limited to these embodiments. The third manufacturing method according to the fourth embodiment may eliminate the punching step S20A in the flow chart illustrated in each of FIGS. 3 and 7 and include a cutting step (S120B), i.e., a bottom removing step (S120). The cutting step (S120B) involves forming the through hole 26d simultaneously with the first inner peripheral surface 21 by cutting. Such an embodiment also achieves favorable effects. The plastic working step S10 in FIG. 8 is similar to the plastic working step S10 performed in the first embodiment.

In each of the first to fourth embodiments, the protrusions 24 or 124 are provided such that each protrusion 24 or 124 protrudes radially inward of the associated outer ring ball groove 22 (defining a portion of the second inner peripheral surface) and toward the axis of the outer ring 20. Movement of the inner ring 40, the balls 50, the retainer 60, and the stub shaft 100 toward the first end of the outer ring 20 causes each ball 50 in contact with and rolling along the surface of the associated outer ring ball groove 22 to partially abut against the associated protrusion 24 or 124, thus restricting further movement of the inner ring 40, the balls 50, the retainer 60, and the stub shaft 100. The invention, however, is not limited to this arrangement. In a first variation, each protrusion may be provided on the associated cylindrical surface 23 serving as a portion of the second inner peripheral surface. Each protrusion may be provided in a manner similar to that described in each of the foregoing embodiments. In this case, the retainer 60 partially abuts (or collides) against each protrusion protruding radially inward of the associated cylindrical surface 23 (defining a portion of the second inner peripheral surface) and the first inner peripheral surface 21. This restricts movement of the inner ring 40, the balls 50, the retainer 60, and the stub shaft 100 when the propeller shaft 1 is assembled to the vehicle. Such a variation also achieves favorable effects.

Assuming that the constant velocity joint 10 is a double offset constant velocity joint (DOJ) in the first to fourth embodiments and the first variation, the methods for manufacturing the outer ring 20 to be included in a double offset constant velocity joint have been described above. The outer ring 20, however, may be included in any other type of constant velocity joint. In a second variation, a constant velocity joint may be a tripod constant velocity joint (TJ). A tripod constant velocity joint includes: an outer ring; a tripod serving as an inner rotational member; and rollers serving as a rolling element. The rollers each roll along an associated raceway groove so as to allow the tripod to move along the axis of the outer ring. The second variation involves providing a protrusion on each raceway groove in a manner similar to that described in each of the foregoing embodiments, such that when the tripod moves significantly along the axis of the outer ring, each roller abuts (or collides) against the associated protrusion. Such a variation achieves effects similar to those described in the foregoing embodiments.

In each of the first to fourth embodiments and the first and second variations, the defining member 30 is press-fitted and secured to the first inner peripheral surface 21. Alternatively, the defining member 30 may be secured to the first inner peripheral surface 21 in any other manner. Instead of press-fitting the defining member 30 to the first inner peripheral surface 21, an alternative embodiment may involve interposing, for example, an adhesive material between the outer peripheral surface 31 of the defining member 30 and the first inner peripheral surface 21 so as to secure the defining member 30 to the first inner peripheral surface 21. In such an alternative embodiment, the defining member 30 naturally has to be secured to the first inner peripheral surface 21 so that the requirements described in the foregoing embodiments (e.g., the requirements for a load for disengagement of the defining member 30 from the first inner peripheral surface 21, and a seal to prevent leakage of grease) are satisfied.

In each of the first to fourth embodiments and the first variation, the protrusions 24 or 124 are provided on either the outer ring ball grooves 22 (each defining a portion of the second inner peripheral surface) or the cylindrical surfaces 23 (each defining a portion of the second inner peripheral surface). The invention, however, is not limited to this arrangement. The protrusions 24 or 124 may be provided on both of the outer ring ball grooves 22 (each defining a portion of the second inner peripheral surface).

In each of the foregoing embodiments and variations, the constant velocity joint 10 includes the outer ring 20, the inner ring 40 (i.e., the inner rotational member), the balls 50 (i.e., the rolling element), and the defining member 30. The outer ring 20 includes the first and second openings 20a and 20b respectively disposed at the first and second ends of the outer ring 20 such that the outer ring 20 has a tubular shape. The inner ring 40 is disposed radially inward of the outer ring 20. The balls 50 are configured to transmit torque between the outer ring 20 and the inner ring 40. The defining member 30 is disposed adjacent to the first opening 20a of the outer ring 20 so as to define the grease-filled region Ar1.

The outer ring 20 includes the first inner peripheral surface 21, the outer ring ball grooves 22 (each defining a portion of the second inner peripheral surface), the cylindrical surfaces 23 (each defining a portion of the second inner peripheral surface), and the protrusions 24 or 124. The first inner peripheral surface 21 extends from the first opening 20a toward the second opening 20b. The first inner peripheral surface 21 is configured such that the defining member 30 is attached to the first inner peripheral surface 21. The outer ring ball grooves 22 and the cylindrical surface 23 extend from the second opening 20b toward the first opening 20a. The inner ring 40 and the balls 50 are moveable along the outer ring ball grooves 22 and the cylindrical surface 23. The protrusions 24 or 124 protrude radially inward of the first inner peripheral surface 21 and the outer ring ball grooves 22. The protrusions 24 or 124 restrict axial movement of the inner ring 40 and the balls 50.

The method for manufacturing the outer ring 20 includes the plastic working step S10 and the bottom removing step (S20, S120). The plastic working step S10 involves providing the bottomed tubular base member 26 including the second opening 20b and the bottom 26 adjacent to a portion of the base member 26 where the first opening 20a is to be provided. The bottom removing step (S20, S120) involves: partially removing the bottom 26 of the base member 25 so as to form the through hole 26d passing through the bottom 26 along the axis of the base member 25; and providing the first inner peripheral surface 21. The plastic working step S10 further involves providing the outer ring ball grooves 22 and the cylindrical surfaces 23 (defining the second inner peripheral surface). The bottom removing step (S20, S120) further involves, in addition to providing the first inner peripheral surface 21, providing the protrusions 24 or 124 such that a surface of the remainder of the bottom 26 resulting from the formation of the through hole 26d and facing toward the second opening 20b serves as the surface 24b of each protrusion 24 and 124.

Thus, manufacture of the constant velocity joint 10 involves providing the base member 25 including the bottom 26 by forging in the plastic working step S10. The manufacture of the constant velocity joint 10 further involves partially removing the bottom 26 so as to form the through hole 26d and providing the first inner peripheral surface 21 in the bottom removing step (S20, S120). Providing the first inner peripheral surface 21 involves providing the protrusions 24 or 124 such that a surface of the remainder of the bottom 26 facing toward the second opening 20b serves as the surface 24b of each protrusion 24 or 124. Each resulting protrusion 24 or 124 functions as a restrictor to restrict movement of the inner ring 40 when the propeller shaft 1 is assembled to the vehicle. The manufacturing method described above easily provides the protrusions 24 or 124 only by forging in the plastic working step S10 and the removing process in the bottom removing step (S20, S120). This means that unlike conventional manufacturing methods, the above-described manufacturing method does not require addition of a circlip, formation of a thickened portion or element by welding, or formation of protrusions by cutting throughout their entirety. Consequently, the manufacturing cost of the constant velocity joint 10 is lower than the manufacturing cost of a conventional constant velocity joint.

In each of the first and second embodiments, the bottom removing step S20 involves: forming the through hole 26d by a punching process using a die; and providing, after the punching process, the first inner peripheral surface 21 by cutting. Because punching is performed using a punch die so as to form the through hole 26d before the first inner peripheral surface 21 is provided, such an embodiment considerably reduces time for cutting required to provide the first inner peripheral surface 21.

In the fourth embodiment, the bottom removing step (S120) does not include the punching step S20A but includes the cutting step (S120B) involving performing cutting so as to form the through hole 26d simultaneously with the first inner peripheral surface 21. This embodiment also provides the protrusions 24 such that a surface of the remainder of the bottom 26 facing toward the second opening 20b serves as the surface 24b of each protrusion 24. Consequently, the fourth embodiment achieves favorable cost-reducing effects.

In each of the first to fourth embodiments, the bottom 26 of the base member 25 includes: the bottom surface 26a; the inclined surfaces 26b each connecting the bottom surface 26a with an associated one of the outer ring ball grooves 22 (each defining a portion of the second inner peripheral surface); and the inclined surfaces 26c each connecting the bottom surface 26a with an associated one of the cylindrical surfaces 23 (each defining a portion of the second inner peripheral surface). The bottom surface 26a, the inclined surfaces 26b, and the inclined surfaces 26c face toward the second opening 20b. The plastic working step S10 involves: providing the outer ring ball grooves 22 (each defining a portion of the second inner peripheral surface) and the cylindrical surfaces 23 (each defining a portion of the second inner peripheral surface); and providing the bottom surface 26a, the inclined surfaces 26b, the inclined surfaces 26c of the bottom 26. The bottom removing step (S20, S120) involves providing the protrusions 24 or 124 such that at least a portion of each inclined surface 26b serves as the surface 24b of the associated protrusion 24 or 124. As previously mentioned, the outer periphery of the bottom surface 26a formed by forging is provided with the inclined surfaces 26b and 26c. Consequently, the life of the forging die will be longer than when the outer periphery of the bottom surface 26a is at right angles to the outer ring ball grooves 22 and the cylindrical surfaces 23.

In each of the first, third, and the fourth embodiments, each protrusion 24 includes: the surface 24b formed by a portion of the associated inclined surface 26b and facing toward the second opening 20b; the surface 24a disposed behind the surface 24b and facing toward the first opening 20a; and the acute angle vertex 24c that is the intersection of the surface 24b facing toward the second opening 20b and the surface 24a facing toward the first opening 20a. The bottom removing step (S20, S120) involves providing the first inner peripheral surface 21 and providing the acute angle vertex 24c by cutting. Thus, the protrusions 24 are easily provided such that each protrusion 24 includes two surfaces, i.e., the surface 24b formed by forging and facing toward the second opening 20b and the surface 24a formed simultaneously with formation of the first inner peripheral surface 21 by cutting and facing toward the first opening 20a.

In the second embodiment, each protrusion 124 includes the top face 124d that is a portion of the inner peripheral surface of the through hole 26d and has the predetermined length L1 along the axis of the outer ring 20. The bottom removing step S20 in the second embodiment involves providing the top face 124d of each protrusion 124 by punching. The top face 124*d* of each protrusion 124 thus provided has the length L1. Accordingly, the load required to allow each ball 50 to go over the associated protrusion 124 at the time of a vehicle collision is easily controlled by adjusting the length L1.

In each of the foregoing embodiments and variations, the second inner peripheral surface of the outer ring 20 of the constant velocity joint 10 includes the outer ring ball grooves 22 and the cylindrical surfaces 23 extending along the axis of the outer ring 20. The outer peripheral surface of the inner ring 40 (i.e., the inner rotational member) of the constant velocity joint 10 is provided with the inner ring ball grooves 41 (i.e., the inner rotational member ball grooves) extending along the axis of the outer ring 20. The constant velocity joint 10 includes the retainer 60 provided with the windows 61 each holding an associated one of the balls 50 (i.e., the rolling element) such that each ball 50 is retained between the outer ring 20 and the inner ring 40. The constant velocity joint 10 is a double offset constant velocity joint configured so that the spherical center P1 of the convex spherical outer peripheral surface of the retainer 60 and the spherical center P2 of the concave spherical inner peripheral surface of the retainer 60 are axially oppositely and equidistantly offset with respect to the joint center O. The bottom removing step (S20, S120) of the method for manufacturing the outer ring 20 involves providing the protrusions 24 or 124 on at least one of the outer ring ball grooves 22 and the cylindrical surfaces 23. The outer ring 20 thus manufactured by the manufacturing method according to any one of the foregoing embodiments and variations of the invention is intended to be included in a double offset constant velocity joint suitable for a propeller shaft. Accordingly, the foregoing embodiments and variations of the invention inexpensively provide the constant velocity joint that enables the propeller shaft to be reliably reduced in overall length at the time of a vehicle collision.

What is claimed:

1. A method for manufacturing an outer ring of a constant velocity joint including an inner rotational member disposed radially inward of the outer ring, a rolling element configured to transmit torque between the outer ring and the inner rotational member, and a defining member that defines a grease-filled region, the method comprising:
    providing a bottomed tubular base member including a second opening, a bottom, and a second inner peripheral surface;
    partially removing the bottom of the tubular base member so as to form the outer ring with a through hole passing through the bottom along an axis of the outer ring; and
    further processing the outer ring at the through hole to form a first opening and a protrusion in the bottom such that a surface of a remainder of the bottom resulting from the formation of the through hole and facing toward the second opening serves as a surface of the protrusion, wherein
    the first opening is at a first end of the outer ring and the second opening is at a second end of the outer ring such that the outer ring has a tubular shape,
    the second inner peripheral surface extends from the second opening toward the first opening and is configured such that the inner rotational member and the rolling element are movable along the second inner peripheral surface,
    the protrusion protrudes radially inward of a first inner peripheral surface and the second inner peripheral surface and is configured to restrict axial movement of the inner rotational member and the rolling element,
    the first inner peripheral surface extends from the first opening toward the second opening and is configured such that the defining member is attachable to the first inner peripheral surface adjacent to the first opening, and
    the second inner peripheral surface includes:
        a plurality of outer ring ball grooves extending along the axis of the tubular base member, and
        a plurality of cylindrical surfaces extending along the axis of the tubular base member, and
    the protrusion is formed on at least one of the outer ring ball grooves and the cylindrical surfaces.

2. The method according to claim 1, wherein
    the through hole is formed by a punching process using a die, and
    forming the first opening includes providing, after the punching process, the first inner peripheral surface by a cutting process.

3. The method according to claim 2, wherein
    providing the bottomed tubular base member includes
        providing a bottom surface of the bottom facing toward the second opening and an inclined surface of the bottom connecting the bottom surface with the second inner peripheral surface and facing toward the second opening, and
    forming the protrusion involves forming the protrusion such that at least a portion of the inclined surface serves as the surface of the protrusion.

4. The method according to claim 3, wherein
    the protrusion includes
        a first surface formed by the portion of the inclined surface and facing toward the second opening,
        a second surface disposed behind the inclined surface and facing toward the first opening, and
        an acute angle vertex that is an intersection of the first surface facing toward the second opening and the second surface facing toward the first opening, and
    the acute angle vertex is formed by the cutting process.

5. The method according to claim 2, further comprising providing a top face of the protrusion by the punching process, the top face having a predetermined length along an axis of the outer ring and being a portion of an inner peripheral surface of the through hole.

6. The method according to claim 1, wherein the through hole and the first inner peripheral surface are formed by a cutting process.

7. A method for manufacturing an outer ring of a constant velocity joint including an inner rotational member disposed radially inward of the outer ring, a rolling element configured to transmit torque between the outer ring and the inner rotational member, and a defining member that defines a grease-filled region, the method comprising:
    providing a bottomed tubular base member including a second opening, a bottom, and a second inner peripheral surface
    partially removing the bottom of the tubular base member so as to form the outer ring with a through hole passing through the bottom along an axis of the outer ring by a punching process using a die; and
    further processing, after the punching process, the outer ring at the through hole to form a first opening and a first inner peripheral surface in the bottom by a cutting process so as to form a protrusion such that a surface of a remainder of the bottom resulting from the formation of the through hole and facing toward the second opening serves as a surface of the protrusion, wherein the first opening is at a first end of the outer ring and the second opening is at a second end of the outer ring such that the outer ring has a tubular shape, the second inner peripheral surface extends from the second opening toward the first opening and is configured such that the inner rotational member and the rolling element are movable along the second inner peripheral surface, the protrusion protrudes radially inward of the first inner peripheral surface and the second inner peripheral surface and is configured to restrict axial movement of the inner rotational member and the rolling element, the first inner peripheral surface extends from the first opening toward the second opening and is configured such that the defining member is attachable to the first inner peripheral surface adjacent to the first opening, and the second inner peripheral surface includes:
- a plurality of outer ring ball grooves extending along the axis of the tubular base member; and
- a plurality of cylindrical surfaces extending along the axis of the tubular base member, and the protrusion is formed on at least one of the outer ring ball grooves and the cylindrical surfaces.

8. The method according to claim 7, wherein providing the bottomed tubular base member includes providing a bottom surface of the bottom facing toward the second opening and an inclined surface of the bottom connecting the bottom surface with the second inner peripheral surface and facing toward the second opening, and forming the protrusion involves forming the protrusion such that at least a portion of the inclined surface serves as the surface of the protrusion.

9. The method according to claim 8, wherein the protrusion includes
- a first surface formed by the portion of the inclined surface and facing toward the second opening,
- a second surface disposed behind the inclined surface and facing toward the first opening, and
- an acute angle vertex that is an intersection of the first surface facing toward the second opening and the second surface facing toward the first opening, and the acute angle vertex is formed by the cutting process.

10. The method according to claim 7, further comprising providing a top face of the protrusion by the punching process, the top face having a predetermined length along an axis of the outer ring and being a portion of an inner peripheral surface of the through hole.

* * * * *